United States Patent
Mori et al.

(10) Patent No.: US 9,534,073 B2
(45) Date of Patent: Jan. 3, 2017

(54) METHOD FOR PRODUCING ONE-COMPONENT MOISTURE-CURING POLYURETHANE COMPOSITION

(71) Applicant: THE YOKOHAMA RUBBER CO., LTD., Minato-Ku, Tokyo (JP)

(72) Inventors: Miyuki Mori, Hiratsuka (JP); Hiroshi Fukui, Hiratsuka (JP); Kiminori Araki, Hiratsuka (JP); Akio Ikeda, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/653,412

(22) PCT Filed: Dec. 6, 2013

(86) PCT No.: PCT/JP2013/082859
§ 371 (c)(1),
(2) Date: Jun. 18, 2015

(87) PCT Pub. No.: WO2014/097907
PCT Pub. Date: Jun. 26, 2014

(65) Prior Publication Data
US 2016/0130386 A1    May 12, 2016

(30) Foreign Application Priority Data

Dec. 20, 2012 (JP) ................. 2012-277669

(51) Int. Cl.
| | | |
|---|---|---|
| C08G 18/24 | (2006.01) |
| C08G 18/12 | (2006.01) |
| C09J 175/04 | (2006.01) |
| C08G 18/48 | (2006.01) |
| C08G 18/08 | (2006.01) |
| C08G 18/73 | (2006.01) |
| C08G 18/77 | (2006.01) |
| C08G 18/78 | (2006.01) |
| C08K 3/04 | (2006.01) |
| C08K 3/26 | (2006.01) |
| C08K 5/12 | (2006.01) |
| C09J 9/00 | (2006.01) |
| C09J 11/04 | (2006.01) |
| C09J 11/06 | (2006.01) |
| C09J 175/08 | (2006.01) |
| C08G 18/22 | (2006.01) |

(52) U.S. Cl.
CPC .......... *C08G 18/12* (2013.01); *C08G 18/0838* (2013.01); *C08G 18/227* (2013.01); *C08G 18/24* (2013.01); *C08G 18/4808* (2013.01); *C08G 18/4812* (2013.01); *C08G 18/73* (2013.01); *C08G 18/771* (2013.01); *C08G 18/7831* (2013.01); *C08G 18/7893* (2013.01); *C08K 3/04* (2013.01); *C08K 3/26* (2013.01); *C08K 5/12* (2013.01); *C09J 9/00* (2013.01); *C09J 11/04* (2013.01); *C09J 11/06* (2013.01); *C09J 175/04* (2013.01); *C09J 175/08* (2013.01); *C08K 2003/265* (2013.01)

(58) Field of Classification Search
CPC . C08G 18/12; C08G 18/4808; C08G 18/0838; C08G 18/73; C08G 18/771
USPC ........................................... 524/775
See application file for complete search history.

(56) References Cited

U.S. PATENT DOCUMENTS

| 6,133,395 A | 10/2000 | Miyata et al. |
| 2009/0077757 A1 | 3/2009 | Tameno et al. |

FOREIGN PATENT DOCUMENTS

| JP | H06-271635 A | 9/1994 |
| JP | 2001-261771 A | 9/2001 |
| JP | 2005-200490 A | 7/2005 |
| JP | 2006-034882 A | 2/2006 |
| JP | 2006-131794 A | 5/2006 |
| JP | 2006131794 A | * 5/2006 |
| JP | 2007-224150 A | 9/2007 |
| JP | 2007224150 A | * 9/2007 |
| JP | 2008-208319 A | 9/2008 |

* cited by examiner

*Primary Examiner* — Kelechi Egwim
(74) *Attorney, Agent, or Firm* — Carrier Blackman & Associates, P.C.; Joseph P. Carrier; Anne G. Sabourin

(57) ABSTRACT

Provided is a method for producing a one-component moisture-curing polyurethane composition, the method comprising: a mixing step in which a liquid component (A) containing a polyol compound is mixed with a powder component (B) containing a filler so as to obtain a paste-like mixture of the liquid component (A) and the powder component (B); a dehydration step in which, following the mixing step, at least a portion of the residual moisture in the paste-like mixture is removed; a prepolymer generation step in which a polyisocyanate compound (C) is mixed with the paste-like mixture following the dehydration step so as to obtain a mixture containing a urethane prepolymer generated by a reaction between the polyisocyanate compound (C) and the polyol compound in the paste-like mixture; and a composition generation step in which the mixture is mixed with an aliphatic isocyanate compound (D) so as to obtain a one-component moisture-curing polyurethane composition.

15 Claims, No Drawings

METHOD FOR PRODUCING ONE-COMPONENT MOISTURE-CURING POLYURETHANE COMPOSITION

TECHNICAL FIELD

The present invention relates to a method for producing a one-component moisture-curing polyurethane composition.

BACKGROUND

One-component moisture-curing polyurethane compositions containing urethane prepolymers are conventionally known and are used, for examples, as adhesives.

An example of a method for producing such a one-component moisture-curing polyurethane composition is the method described in Patent Document 1. According to this method, it is possible to "obtain a one-component moisture-curing polyurethane composition capable of maintaining good viscosity even when a metal catalyst is used for the generation of a urethane prepolymer in order to reduce the synthesis time, the composition having excellent thixotropy as well as a good appearance" ([0011] in Patent Document 1).

PRIOR ART DOCUMENT

Patent Document

Patent Document 1: Japanese Unexamined Patent Application Publication No. 2007-224150

SUMMARY OF THE INVENTION

Problems to be Solved by the Invention

The window glass of an automobile was conventionally attached to the body via a rubber gasket, but since the ability of a rubber gasket to hold the glass at the time of an impact is low, the window glass is currently attached to the body directly using an adhesive. In this case, the adhesive surfaces are the window glass and a coated steel plate constituting the body, but a primer is used on both surfaces in order to improve the adhesiveness.

Incidentally, there has been an increase in demand for a reduction in the use of primers in recent years from the perspectives of the environment, workability, cost, and the like.

Therefore, as a result of investigating the one-component moisture-curing polyurethane composition obtained with the method described in Patent Document 1, the present inventors learned that the adhesiveness with the body (coated steel plate) is insufficient and that reducing the use of a primer is difficult.

The present invention was conceived in light of the points described above, and an object of the present invention is to provide a method for producing a one-component moisture-curing polyurethane composition having excellent adhesiveness with a coated steel plate.

Means to Solve the Problem

As a result of conducting dedicated research in order to achieve the object described above, the present inventors discovered that a one-component moisture-curing polyurethane composition obtained by first obtaining a urethane prepolymer and then adding and mixing an aliphatic isocyanate compound has excellent adhesiveness, and the present inventors thereby completed the present invention.

Specifically, the present invention provides the following (1) to (6).

(1) A method for producing a one-component moisture-curing polyurethane composition, the method comprising: a mixing step in which a liquid component (A) containing a polyol compound having two or more hydroxy groups in each molecule is mixed with a powder component (B) containing a filler so as to obtain a paste-like mixture of the liquid component (A) and the powder component (B); a dehydration step in which, following the mixing step, at least a portion of the residual moisture in the paste-like mixture is removed; a prepolymer generation step in which a polyisocyanate compound (C) having two or more isocyanate groups in each molecule is mixed with the paste-like mixture following the dehydration step so as to obtain a mixture containing a urethane prepolymer generated by a reaction between the polyisocyanate compound (C) and the polyol compound in the paste-like mixture; and a composition generation step in which the mixture is mixed with an aliphatic isocyanate compound (D) having at least two isocyanate groups in each molecule so as to obtain a one-component moisture-curing polyurethane composition.

(2) The method for producing a one-component moisture-curing polyurethane composition according to (1), wherein the dehydration step is a step in which the moisture content of the paste-like mixture is controlled to at most 0.050 mass %.

(3) The method for producing a one-component moisture-curing polyurethane composition according to (1) or (2), wherein in the composition generation step, a curing catalyst for inducing the moisture curing of the one-component moisture-curing polyurethane composition is further added.

(4) The method for producing a one-component moisture-curing polyurethane composition according to one of (1) to (3), wherein in the prepolymer generation step, the polyisocyanate compound (C) and the paste-like mixture obtained in the mixing step are added and mixed sequentially.

(5) The method for producing a one-component moisture-curing polyurethane composition according to any one of (1) to (4), wherein in the prepolymer generation step, after the polyisocyanate compound (C) is mixed with the paste-like mixture obtained in the mixing step, a metal catalyst for accelerating a reaction for generating the urethane prepolymer is mixed.

(6) The method for producing a one-component moisture-curing polyurethane composition according to one of (1) to (5), wherein the aliphatic isocyanate compound (D) is at least one type selected from the group consisting of a reaction product of hexamethylene diisocyanate and trimethylolpropane, a biuret of hexamethylene diisocyanate, and an isocyanurate of hexamethylene diisocyanate.

Effect of the Invention

With the present invention, it is possible to provide a method for producing a one-component moisture-curing polyurethane composition having excellent adhesiveness with a coated steel plate.

BEST MODE FOR CARRYING OUT THE INVENTION

The method for producing a one-component moisture-curing polyurethane composition according to the present invention (simply called the "production method of the present invention" hereafter) is a method for producing a one-component moisture-curing polyurethane composition, the method comprising: a mixing step in which a liquid component (A) containing a polyol compound having two or more hydroxy groups in each molecule is mixed with a powder component (B) containing a filler so as to obtain a paste-like mixture of the liquid component (A) and the powder component (B); a dehydration step in which, following the mixing step, at least a portion of the residual moisture in the paste-like mixture is removed; a prepolymer generation step in which a polyisocyanate compound (C) having two or more isocyanate groups in each molecule is mixed with the paste-like mixture following the dehydration step so as to obtain a mixture containing a urethane prepolymer generated by a reaction between the polyisocyanate compound (C) and the polyol compound in the paste-like mixture; and a composition generation step in which the mixture is mixed with an aliphatic isocyanate compound (D) having at least two isocyanate groups in each molecule so as to obtain a one-component moisture-curing polyurethane composition.

With the production method of the present invention, a one-component moisture-curing polyurethane composition in which the urethane prepolymer and the aliphatic isocyanate compound (D) coexist with one another is obtained by separately providing the prepolymer generation step and the composition generation step and adding the aliphatic isocyanate compound (D) after generating the urethane prepolymer.

The one-component moisture-curing polyurethane composition obtained in this way has excellent adhesiveness with a coated steel plate or the like constituting an automobile body. It is thought that the adhesiveness becomes favorable since an isocyanate which contributes to adhesion (the aliphatic isocyanate compound (D)) is present separately from the isocyanate required for the skeleton of the urethane prepolymer (the polyisocyanate compound (C)).

Such an effect is also supported by the fact that in the [Working Examples] described below, the adhesiveness of compositions obtained by adding the aliphatic isocyanate compound (D) at the same time as the polyisocyanate compound (C) in the prepolymer generation step is insufficient (see Comparative Examples 2 to 4). In this case, it is thought that the aliphatic isocyanate compound (D) is formed integrally with the urethane prepolymer and is not in a coexisting state.

Each component and each step of the production method of the present invention will be described in detail hereinafter.

<Liquid Component (A)>

The liquid component (A) is not particularly limited provided it is a component containing a polyol compound having two or more hydroxy groups in each molecule, and the component may contain the polyol compound alone or may contain a plasticizer or the like in addition to the polyol compound.

Here, from the perspective of ensuring that the component is a liquid at the temperature at the time of mixing in the mixing step described below and from the perspective of the viscosity at the time of urethane prepolymer generation, the melting point of the polyol compound in the liquid component (A) is preferably at most 80° C. and more preferably at most 60° C.

The polyol compound is not particularly limited with respect to its molecular weight, skeleton, and the like provided it is a compound having two or more hydroxy groups (OH groups), and specific examples thereof include low-molecular-weight polyhydric alcohols, polyether polyols, polyester polyols, other types of polyols, and polyol mixtures thereof.

Specific examples of the low-molecular-weight polyhydric alcohol include low-molecular-weight polyols such as ethylene glycol (EG), diethylene glycol, propylene glycol (PG), dipropylene glycol, 1,3-butanediol, 1,4-butanediol, pentanediol, neopentyl glycol, hexanediol, cyclohexanedimethanol, glycerin 1,1,1-trimethylolpropane (TMP), 1,2,5-hexanetriol, pentaerythritol, and the like; sugars such as sorbitol and the like; and the like.

The polyether polyols and polyester polyols may generally be compounds derived from the low-molecular-weight polyhydric alcohols, but in the present invention, compounds derived from aromatic diols, amines, and alkanolamines shown below may also be favorably used.

Here, specific examples of the aromatic diol include resorcin (m-dihydroxybenzene), xylylene-glycol, 1,4-benzene dimethanol, styrene glycol, 4,4'-dihydroxyethyl phenol; and compounds having bisphenol skeletons of a bisphenol A structure (4,4'-dihydroxyphenylpropane), a bisphenol F structure (4,4'-dihydroxyphenylmethane), a brominated bisphenol A structure, a hydrogenated bisphenol A structure, a bisphenol S structure, and a bisphenol AF structure shown below.

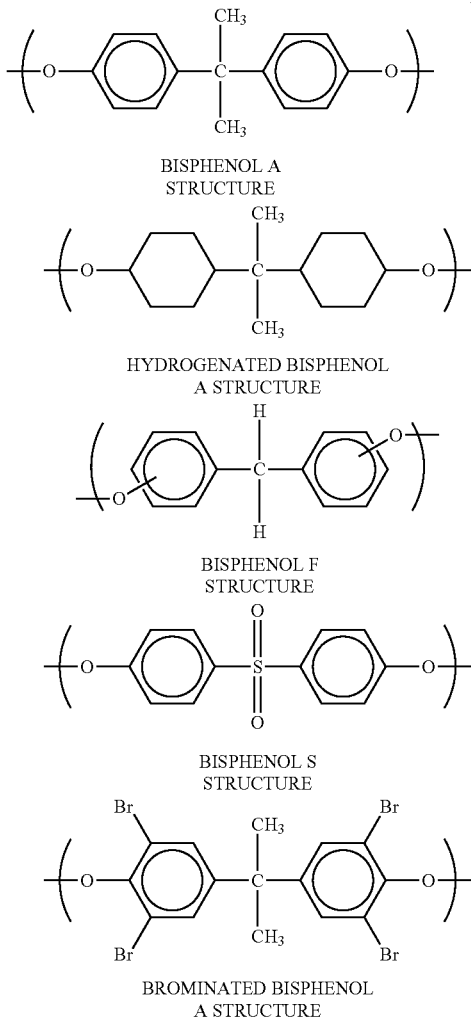

Formula 1

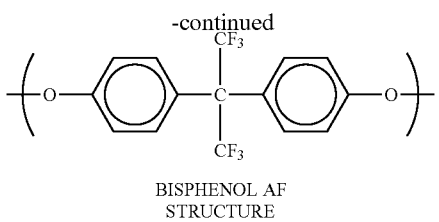

BISPHENOL AF
STRUCTURE

Additionally, specific examples of the amines include ethylenediamine, hexamethylenediamine, and the like. Specific examples of the alkanolamine include ethanolamine, propanolamine, and the like.

Examples of the polyether polyols include polyols obtained by adding at least one oxide selected from the group consisting of styrene oxide and alkylene oxides such as ethylene oxide, propylene oxide, butylene oxide (tetramethylene oxide), tetrahydrofuran, and the like to at least one compound selected from the low-molecular-weight polyhydric alcohols, the aromatic diols, the amines, and the alkanolamines.

Specific examples of the polyether polyols include polyethylene glycol, polypropylene glycol (PPG), polypropylene triol, ethylene oxide/propylene oxide copolymers, polytetramethylene ether glycol (PTMEG), polytetraethylene glycol, sorbitol polyols, and the like.

Likewise, examples of the polyester polyols include the condensation products (condensed polyester polyols) of any of the low-molecular-weight polyhydric alcohols, the aromatic diols, the amines, or the alkanolamines with a polybasic carboxylic acid; lactone polyols; polycarbonate polyols; and the like.

Specific examples of the polybasic carboxylic acids which may be used here to form the condensed polyester polyol include glutaric acid, adipic acid, azelaic acid, fumaric acid, maleic acid, pimelic acid, suberic acid, sebacic acid, phthalic acid, terephthalic acid, isophthalic acid, dimer acid, pyromellitic acid, other low-molecular-weight carboxylic acids, oligomeric acids, castor oil, hydroxycarboxylic acids such as a reaction product of castor oil with ethylene glycol (or propylene glycol), and the like.

In addition, specific examples of the lactone polyols include compounds obtained by ring-opening polymerization of a lactone such as ε-caprolactone, α-methyl-ε-caprolactone, ε-methyl-ε-caprolactone, or the like with a suitable polymerization initiator, and having hydroxy groups at both ends.

Examples of other polyols include polymeric polyols having carbon-carbon bonds on a main-chain skeleton, such as acrylic polyols, polybutadiene polyols, hydrogenated polybutadiene polyols, and the like.

In the present invention, the various polyol compounds mentioned above may be used alone or may be used in any combination of two or more types.

Of these, the compound is preferably polypropylene glycol due to an excellent balance of hardness and breaking elongation of the one-component moisture-curing polyurethane composition containing the liquid component (A) as well as an excellent balance of cost.

In addition, a polyol with a weight average molecular weight of approximately 100 to 10,000 is preferable, and a polyol with a weight average molecular weight of from 1000 to 5000 is more preferable. When the weight average molecular weight is within this range, the physical properties (for example, hardness, breaking strength, and breaking elongation) and the viscosity of the urethane prepolymer generated by a reaction with the polyisocyanate compound (C) described below become favorable.

Specific examples of plasticizers include diisononyl adipate (DINA); diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, and butylene glycol adipate polyester. One type of these may be used alone, or two or more types may be used in combination.

Of these, it is preferable to use diisononyl adipate (DINA) and diisononyl phthalate (DINP) due to their cost and excellent compatibility.

When the liquid component (A) contains the plasticizer described above, the content thereof is not particularly limited, but the content is preferably from 20 to 80 parts by mass and more preferably from 30 to 70 parts by mass per total of 100 parts by mass of the polyol compound and the polyisocyanate compound (C).

<Powder Component (B)>

The powder component (B) is not particularly limited provided it is a component containing a filler, and it may contain the filler alone or may contain various other additives or the like such as antiaging agents, antioxidants, pigments (dyes), thixotropic agents, UV absorbents, flame retardants, surfactants (including leveling agents), dispersants, dehydrating agents, adhesion promoters, and antistatic agents, for example, in addition to the filler.

The filler can be an organic or inorganic filler of any form. Specific examples include fumed silica, calcined silica, precipitated silica, pulverized silica, molten silica; diatomaceous earth; iron oxide, zinc oxide, titanium oxide, barium oxide, magnesium oxide; calcium carbonate, heavy calcium carbonate, precipitated calcium carbonate (light calcium carbonate), colloidal calcium carbonate, magnesium carbonate, zinc carbonate; pyrophyllite clay, kaolin clay, calcined clay; carbon black; fatty acid treated products, resin acid products, urethane compound treated products, and fatty acid ester treated products thereof. One type of these may be used alone, or two or more types may be used in combination.

Of these, the filler is preferably carbon black or heavy calcium carbonate from the perspective of facilitating the adjustment of the viscosity or thixotropy of the one-component moisture-curing polyurethane composition. Specifically, when carbon black is used, the composition demonstrates excellent physical properties (for example, hardness, stretching, and the like), and when heavy calcium carbonate is used, the composition demonstrates excellent deep curability.

In addition, the filler is preferably pellet carbon black, not only from the perspective that the workability is favorable, but also from the perspective that the dehydration of the liquid component (A) as well as carbon black is further accelerated in the mixing step with the liquid component (A) as described above.

Specific examples of the antiaging agents include compounds such as a hindered phenol compound and the like.

Specific examples of the antioxidants include butylhydroxytoluene (BHT), butylhydroxyanisole (BHA), and the like.

Specific examples of pigments include inorganic pigments such as titanium oxide, zinc oxide, ultramarine, iron red, lithopone, lead, cadmium, iron, cobalt, aluminum, hydrochlorides, and sulfates; and organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigment, and carbon black.

Specific examples of the thixotropic agent include Aerosil (manufactured by Nippon Aerosil), Disparlon (manufactured by Kusumoto Chemicals, Ltd.), and the like.

Specific examples of adhesion promoters include terpene resins, phenol resins, terpene-phenol resins, rosin resins, and xylene resins.

Specific examples of the flame retardant include chloroalkyl phosphates, dimethyl-methyl phosphates, bromine-phosphorus compounds, ammonium polyphosphates, neopentyl bromide polyethers, brominated polyethers, and the like.

Specific examples of the antistatic agent include quaternary ammonium salts; hydrophilic compounds such as polyglycols, ethylene oxide derivatives, and the like; and the like.

The compounding ratio of the powder component (B) is not particularly limited but is preferably from 50 to 150 parts by mass and more preferably from 70 to 130 parts by mass per total of 100 parts by mass of the polyol compound and the polyisocyanate compound (C).

<Polyisocyanate Compound (C)>

The polyisocyanate compound (C) is not particularly limited provided it is a polyisocyanate compound having two or more isocyanate groups in each molecule, and specific examples thereof include aromatic polyisocyanates such as tolylene diisocyanate (TDI), diphenylmethane diisocyanate (MDI), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates such as hexamethylene diisocyanate (HDI), trimethylhexamethylene diisocyanate (TMHDI), lysine diisocyanate, and norbornane diisocyanate methyl (NBDI); alicyclic polyisocyanates such as transcyclohexane-1,4-diisocyanate, isophorone diisocyanate (IPDI), bis(isocyanate methyl)cyclohexane ($H_6$XDI), and dicyclohexylmethane diisocyanate ($H_{12}$MDI); and carbodiimide-modified polyisocyanates and isocyanurate-modified polyisocyanates of these polyisocyanate compounds. One type of these may be used alone, or two or more types may be used in combination.

Of these, the polyisocyanate compound (C) is preferably an aromatic polyisocyanate and more preferably tolylene diisocyanate (TDI) or diphenylmethane diisocyanate (MDI) in that the generated urethane prepolymer becomes difficult to mix with the aliphatic isocyanate compound (D) described below so that they are likely to coexist with one another, which improves the adhesiveness thereof.

The compounding ratio of the polyisocyanate compound (C) is not particularly limited but is preferably an amount so that the equivalence ratio of the isocyanate groups (NCO) in the polyisocyanate compound (C) and the hydroxy groups (OH) in the polyol compound is, for example, from 1.1 to 2.5.

<Aliphatic Isocyanate Compound (D)>

The aliphatic isocyanate compound (D) is not particularly limited provided it is an aliphatic isocyanate compound having two or more isocyanate groups in each molecule, and examples thereof include the aliphatic polyisocyanates listed as examples of the polyisocyanate compound (C) described above.

That is, specific examples of the aliphatic isocyanate compound (D) include aliphatic polyisocyanates such as hexamethylene diisocyanate (HDI), trimethylhexamethylene diisocyanate (TMHDI), lysine diisocyanate, and norbornane diisocyanate methyl (NBDI). One type of these may be used alone, or two or more types may be used in combination.

In addition to the aliphatic polyisocyanates described above, the aliphatic isocyanate compound (D) may also be, for example, a reaction product of the aliphatic polyisocyanates described above and a triol; or a modified form such as a biuret or isocyanurate of the aliphatic polyisocyanates described above. One type of these may be used alone, or two or more types may be used in combination.

Here, the triol described is not particularly limited provided it has three hydroxy groups in each molecule, and examples thereof include 1,2,5-hexanetriol, 1,2,6-hexanetriol, 1,2,3-propanetriol, 1,2,3-benzenetriol, 1,2,4-benzenetriol, trimethylolethane, and trimethylolpropane.

Such an aliphatic isocyanate compound (D) is preferably at least one type selected from the group consisting of a reaction product of HDI and trimethylolpropane, a biuret of HDI, and an isocyanurate of HDI in that the composition yields better adhesive effects.

The compounding ratio of the aliphatic isocyanate compound (D) is not particularly limited but is preferably from 0.5 to 15 parts by mass and more preferably from 2 to 10 parts by mass per total of 100 parts by mass of the polyol compound and the polyisocyanate compound (C) in that the composition yields better adhesive effects.

[Mixing Step]

The mixing step in the production method of the present invention is a step in which the liquid component (A) and the powder component (B) are mixed so as to obtain a paste-like mixture of the liquid component (A) and the powder component (B).

Here, the method of mixing the liquid component (A) and the powder component (B) is not particularly limited provided it is a conventionally known mixing method, and a specific preferred example is a method of mixing using a roller, a kneader, a pressure kneader, a Banbury mixer, a horizontal mixer (for example, a Lodige mixer or the like), a vertical mixer (for example, a planetary mixer or the like), a universal blender, or the like.

In addition, the temperature and time at the time of mixing differ depending on the types of the liquid component (A) and the powder component (B) and are therefore not particularly limited, but the temperature and time are preferably approximately 20 to 110° C. and from 30 minutes to 2 hours, respectively. Furthermore, since the liquid component (A) must be a liquid at the temperature at the time of mixing in the mixing step, when the temperature at the time of mixing is 100° C., for example, it is necessary to use a liquid component (A) containing a polyol compound having a melting point lower than this temperature.

In the present invention, by including such a mixing step, it is possible to remove a portion of the moisture in the liquid component (A) and the powder component (B).

It is thought that at the time of the mixing of the liquid component (A) and the powder component (B), the powder component (B) is easily crushed due to the absence of a solvent such as toluene, and moisture can be removed by the pressure or heat generated at this time.

In addition, when pellet carbon black is used as the powder component (B) in the present invention, the mixing step preferably comprises mixing the liquid component (A) and the pellet carbon black while pulverizing the pellet carbon black.

This is because the pressure or heat generation described above increases due to the pulverization of the pellet carbon black and that the dehydration of the liquid component (A) and the pellet carbon black is therefore further accelerated.

Here, a preferable example of a method of mixing while pulverizing is the method of mixing using a horizontal mixer (for example, a Lodige mixer or the like) capable of mixing in a state in which pressure is applied to the pellet carbon black at the time of mixing from among the mixing methods given as examples above.

[Dehydration Step]

The dehydration step in the production method of the present invention is a step in which at least a portion of the residual moisture in the paste-like mixture is removed.

Here, a specific example of the method of removing the residual moisture is a method of drying for at least 30 minutes at 30 to 60° C. in a vacuum (at most 1.2 kPa, preferably from 0.6 to 1.2 kPa).

The reason that the residual moisture can be removed with such a simple method is that the mixture is in a paste form and that, as described above, a portion of the moisture can unexpectedly be removed by pressure or heat generation when the powder component is crushed in the mixing method.

In addition, the present inventors discovered that when the dehydration (drying) of the paste-like mixture is insufficient, this may have an effect on the presence of the aliphatic isocyanate compound (D) added in the composition generation step described below, and the adhesiveness of the resulting composition may be diminished.

Therefore, from the perspective of further improving the adhesiveness by sufficiently dehydrating the paste-like mixture, the drying time is preferably from 30 to 180 minutes and more preferably from 60 to 150 minutes when drying at 30 to 60° C. and at most 1.2 kPa.

Furthermore, from a similar perspective, the moisture content of the paste-like mixture is preferably controlled to at most 0.050 mass %, more preferably controlled to at most 0.025 mass %, and even more preferably controlled to at most 0.015 mass % with the method described above in the dehydration step.

The moisture content of the paste-like mixture is measured using the Karl-Fischer method. Specifically, the moisture content can be measured in accordance with a Coulometric titration method using a moisture measurement device (produced by Mitsubishi Chemical Co., Ltd.) and using an electrolyte solution primarily consisting of iodide ions, sulfur dioxide, and alcohol (trade name Aquamicron CXU, produced by API Corporation) as a Karl-Fischer reagent.

[Prepolymer Generation Step]

The prepolymer generation step in the production method of the present invention is a step in which the polyisocyanate compound (C) and the paste-like mixture following the dehydration step are mixed so as to obtain a mixture containing a urethane prepolymer generated by a reaction between the polyisocyanate compound (C) and the polyol compound in the paste-like mixture.

In addition to the urethane prepolymer described above, the mixture contains at least the powder (B) derived from the paste-like mixture described above.

Here, a preferred method of mixing the polyisocyanate compound (C) and the paste-like mixture is the same method as the mixing method in the mixing step described above.

In addition, the temperature and atmosphere at the time of mixing differ depending on the type of the polyol compound in the paste-like mixture or the polyisocyanate compound (C) and are therefore not particularly limited, but from the perspective of generating a urethane prepolymer, the components are preferably mixed at a temperature equal to or greater than the melting point of the polyisocyanate compound (C) and are preferably mixed at reduced pressure or in an inert gas atmosphere such as nitrogen or argon.

By including such a prepolymer generation step in the present invention, the powder component (B) in the paste-like mixture is crushed due to thickening associated with the prepolymer formation of the urethane prepolymer, which results in good dispersibility and good thixotropy of the one-component moisture-curing polyurethane composition.

In addition, in the present invention, the prepolymer generation step preferably comprises sequentially adding and mixing the polyisocyanate compound (C) and the paste-like mixture due to the following reasons.

Specifically, by adding the components in this order, the polyol compound is added to the polyisocyanate compound (C), so a stable urethane prepolymer reaction occurs, and a urethane prepolymer with a uniform molecular weight is thus generated.

On the other hand, in the present invention, the prepolymer generation step preferably comprises sequentially adding and mixing the paste-like mixture and the polyisocyanate compound (C) due to the following reasons.

Specifically, by adding the components in this order, the prepolymer generation step can be implemented by adding the polyisocyanate compound (C) directly into the horizontal mixer used in the mixing step to obtain the paste-like mixture, for example, which results in good workability.

In the prepolymer generation step of present invention, it is preferable for a metal catalyst for accelerating the urethane prepolymer generation reaction to be further mixed after the polyisocyanate compound (C) and the paste-like mixture are mixed.

As a result, the viscosity of the generated urethane prepolymer can be maintained at a favorable level. It is thought that when a metal catalyst is added in the presence of the powder component (B), sudden urethane prepolymer generation reactions do not occur, so the viscosity can be maintained at a favorable level.

An example of such a metal catalyst is an organic metal catalyst, and specific examples thereof include dibutyl tin dilaurate, dioctyl tin laurate (DOTL), dioctyl tin dilaurate, and bismuth catalysts (for example, inorganic bismuth (NEOSTANN U-600, U-660), or the like produced by Nitto Kasei Co., Ltd.).

When the metal catalyst described above is used, the compounding ratio thereof is preferably from 0.001 to 0.02 parts by mass and more preferably from 0.002 to 0.01 parts by mass per total of 100 parts by mass of the polyol compound and the polyisocyanate compound (C).

In the prepolymer generation step, the generation rate of the urethane prepolymer is preferably higher and is preferably set to at least 80% in that the aliphatic isocyanate compound (D) becomes difficult to mix with the urethane prepolymer and the adhesiveness improves further.

At this time, the generation rate of the urethane prepolymer can be determined from the NCO % in the mixture measured by an HCl back titration method.

[Composition Generation Step]

The composition generation step in the production method of the present invention is a step in which the mixture described above and the aliphatic isocyanate compound (D) are mixed so as to obtain a one-component moisture-curing polyurethane composition.

The resulting one-component moisture-curing polyurethane composition contains at least the powder (B), the urethane prepolymer, and the aliphatic isocyanate (D).

Here, a preferred method of mixing the mixture with the aliphatic isocyanate compound (D) is the same method as the mixing method in the mixing step described above.

In addition, the temperature and atmosphere at the time of mixing are not particularly limited, but the components are preferably mixed at a temperature equal to or greater than the melting point of the aliphatic isocyanate compound (D) and are preferably mixed at reduced pressure or in an inert gas atmosphere such as nitrogen or argon.

In the present invention, a one-component moisture-curing polyurethane composition in which the urethane prepolymer and the aliphatic isocyanate compound (D) coexist with one another can be obtained by adding the aliphatic isocyanate compound (D) in the composition generation step after generating the urethane prepolymer in the prepolymer generation step, and this composition has excellent adhesiveness to a coated steel sheet.

In addition, in the composition generation step described above, it is preferable to further add a curing catalyst for inducing the moisture curing of the resulting one-component moisture-curing polyurethane composition. This yields even better adhesive effects.

Such a curing catalyst is not particularly limited provided it induces moisture curing, and a conventionally known catalyst can be used, specific examples of which include the organic metal catalysts listed as examples of metal catalysts used in the prepolymer generation step described above.

When the curing catalyst described above is used, the compounding ratio thereof is preferably from 0.001 to 0.05 parts by mass and more preferably from 0.002 to 0.03 parts by mass per total of 100 parts by mass of the polyol compound, the polyisocyanate compound (C), and the aliphatic isocyanate compound (D).

As described above, the one-component moisture-curing polyurethane composition obtained by the production method of the present invention has excellent adhesiveness and is therefore suitable for adhesive applications for automotive or architectural use.

In particular, since the composition has good adhesiveness to coated steel plates, it is possible to avoid the use of a primer, which was conventionally used at the interface of a coated steel plate and an adhesive when attaching a window glass of an automobile to the body (coated steel plate).

EXAMPLES

The present invention will be described in detail below with reference to examples. However, the present invention is not limited to these examples.

Working Examples 1 to 7

Mixing Step

First, polyol compounds 1 and 2 and a plasticizer were added to a Lodige mixer (produced by the Matsubo Corporation) as a liquid component (A), and then carbon black and calcium carbonate were added as a powder component (B). These were stirred for two hours at 110° C. to prepare a paste-like mixture. The added amounts (compounding ratios) are as shown in Table 1 below (same hereafter).

(Dehydration Step)

Next, the inside of the Lodige mixer containing the paste-like mixture was set to 30 to 60° C. and at most 1.2 kPa and dried for the amount of time shown in Table 1 below (units: minutes). The moisture content (units: mass %) of the paste-like mixture after drying was measured. The results are shown in Table 1 below.

(Prepolymer Generation Step)

Next, MDI was added to a planetary mixer as a polyisocyanate compound (C), and after the dried paste-like mixture described above was further added, a metal catalyst was added and stirred for one hour at 60° C. A urethane prepolymer was generated by a reaction between the MDI and the polyol compounds 1 and 2 in the paste-like mixture.

(Composition Generation Step)

Next, the aliphatic isocyanate compound (D) shown in Table 1 below was added to the planetary mixer in which the urethane prepolymer was generated, and a curing catalyst was further added and stirred for ten minutes at 60° C. to prepare a one-component moisture-curing polyurethane composition (also simply called a "composition" hereafter).

Comparative Example 1

A one-component moisture-curing polyurethane composition was prepared in the same manner as in Working Examples 1 to 7 with the exception that an aromatic isocyanate compound was added instead of the aliphatic isocyanate compound (D) in the composition generation step.

The aromatic isocyanate compound is not the aliphatic isocyanate compound (D), but the step is collectively described as the "(D) adding step" for the sake of convenience in Table 1 below.

Comparative Examples 2 to 4

In the prepolymer generation step, a urethane prepolymer was generated by adding and mixing the aliphatic isocyanate compound (D) at the same time that the polyisocyanate compound (C) was added, and only a curing catalyst was added in the composition generation step. The one-component moisture-curing polyurethane compositions were otherwise prepared in the same manner as in Working Examples 1 to 7.

Comparative Example 5

In the composition generation step, only a curing catalyst was added without adding the aliphatic isocyanate compound (D). The one-component moisture-curing polyurethane composition was otherwise prepared in the same manner as in Working Examples 1 to 7.

In Comparative Example 5, the aliphatic isocyanate compound (D) was not added, so "-" was entered as the "(D) adding step" in Table 1 below.

<Adhesiveness>

The compositions of Working Examples 1 to 7 and Comparative Examples 1 to 5 were applied to coated steel sheets coated with paint, and these were left to stand for 24 hours in an atmosphere at 20° C. and 60% RH (±5%) to obtain test pieces. Hand peeling tests were performed by means of knife cutting using the resulting test pieces.

As a result of the hand peeling tests, cases in which the entire composition exhibited cohesive failure but no interfacial peeling were evaluated as "⊚" as cases with excellent adhesiveness; cases in which less than 20% of the coating area exhibited interfacial peeling and the remainder exhibited cohesive failure were evaluated as "○" as cases with somewhat superior adhesiveness; cases in which at least 20% and less than 50% of the coating area exhibited interfacial peeling were evaluated as "Δ" as cases with somewhat inferior adhesiveness; and cases in which at least 50% of the coating area exhibited interfacial peeling were evaluated as "×". The results are shown in Table 1 below.

compound (D) after generating the urethane prepolymer, demonstrated good adhesiveness to coated steel plates.

In contrast, the composition of Comparative Example 1, in which an aromatic isocyanate compound was added instead of the aliphatic isocyanate compound (D), demonstrated inferior adhesiveness.

TABLE 1

|   |   | Working Example | | | | | | | Comparative Example | | | | |
|---|---|---|---|---|---|---|---|---|---|---|---|---|---|
|   |   | 1 | 2 | 3 | 4 | 5 | 6 | 7 | 1 | 2 | 3 | 4 | 5 |
| (A) | Polyol compound 1 | 25 | 25 | 25 | 25 | 25 | 25 | 25 | 25 | 25 | 25 | 25 | 25 |
|   | Polyol compound 2 | 50 | 50 | 50 | 50 | 50 | 50 | 50 | 50 | 50 | 50 | 50 | 50 |
|   | Plasticizer | 50 | 50 | 50 | 50 | 50 | 50 | 50 | 50 | 50 | 50 | 50 | 50 |
| (B) | Carbon black | 50 | 50 | 50 | 50 | 50 | 50 | 50 | 50 | 50 | 50 | 50 | 50 |
|   | Calcium carbonate | 50 | 50 | 50 | 50 | 50 | 50 | 50 | 50 | 50 | 50 | 50 | 50 |
| (C) | MDI | 10 | 10 | 10 | 10 | 10 | 10 | 10 | 10 | 10 | 10 | 10 | 10 |
| Metal catalyst |   | 0.003 | 0.003 | 0.003 | 0.003 | 0.003 | 0.003 | 0.003 | 0.003 | 0.003 | 0.003 | 0.003 | 0.003 |
| (D) | HDI biuret | 2 | 0 | 0 | 4 | 6 | 0 | 2 | 0 | 2 | 0 | 0 | 0 |
|   | HDI TMP adduct | 0 | 2 | 0 | 0 | 0 | 0 | 0 | 0 | 0 | 2 | 0 | 0 |
|   | HDI isocyanurate | 0 | 0 | 2 | 0 | 0 | 0 | 0 | 0 | 0 | 0 | 2 | 0 |
|   | HDI | 0 | 0 | 0 | 0 | 0 | 2 | 0 | 0 | 0 | 0 | 0 | 0 |
| Aromatic isocyanate compound |   | 0 | 0 | 0 | 0 | 0 | 0 | 0 | 2 | 0 | 0 | 0 | 0 |
| Curing catalyst |   | 0.01 | 0.01 | 0.01 | 0.01 | 0.01 | 0.01 | 0.01 | 0.01 | 0.01 | 0.01 | 0.01 | 0.01 |
| Drying time/min |   | 60 | 60 | 60 | 60 | 60 | 60 | 30 | 60 | 60 | 60 | 60 | 60 |
| Moisture/mass % |   | 0.01 | 0.01 | 0.01 | 0.01 | 0.01 | 0.01 | 0.03 | 0.01 | 0.01 | 0.01 | 0.01 | 0.01 |
| (D) Adding step |   | Composition generation step | | | | | | | Prepolymer generation step | | | | — |
| Adhesion |   | ◎ | ◎ | ◎ | ◎ | ◎ | ○ | ○ | Δ | Δ | Δ | Δ | X |

The components described in Table 1 above are as follows.

Polyol compound 1: difunctional polypropylene glycol (EXCENOL 2020, produced by Asahi Glass Co., Ltd.)
Polyol compound 2: trifunctional polypropylene glycol (EXCENOL 5030, produced by Asahi Glass Co., Ltd.)
Plasticizer: diisononyl phthalate (produced by Jay Plus, Inc.)
Carbon black: mixture of Carbon Black 1 (Niteron 200, produced by Shinnikka Carbon Co., Ltd.) and Carbon Black 2 (Niteron 300, produced by Shinnikka Carbon Co., Ltd.) (mass ratio=75/25)
Calcium carbonate: heavy calcium carbonate (Super S, produced by Maruo Calcium Co., Ltd.)
MDI: Diphenylmethane diisocyanate (Cosmonate PH, produced by Mitsui Chemicals, Inc.)
Metal catalyst: bismuth catalyst (NEOSTANN U-600, produced by Nitto Kasei Co., Ltd.)
HDI biuret: hexamethylene diisocyanate (TAKENATE D-165N, produced by Mitsui Chemicals, Inc.)
HDI TMP adduct: reaction product of hexamethylene diisocyanate and trimethylolpropane (TAKENATE D-160N, produced by Mitsui Chemicals, Inc.)
HDI isocyanurate: isocyanurate of hexamethylene diisocyanate (TAKENATE D-170N, produced by Mitsui Chemicals, Inc.)
HDI: hexamethylene diisocyanate (Duranate 50M-HDI, produced by Asahi Kasei Co., Ltd.)
Aromatic isocyanate compound: diphenylmethane diisocyanate (Cosmonate PH, produced by Mitsui Chemicals, Inc.)
Curing catalyst: tin catalyst (NEOSTANN U-810, produced by Nitto Kasei Co., Ltd.)

As is clear from the results shown in Table 1, it was shown that the compositions of Working Examples 1 to 7, which were obtained by adding and mixing the aliphatic isocyanate compound (D) after generating the urethane prepolymer, demonstrated good adhesiveness to coated steel plates.

In addition, the compositions of Comparative Examples 2 to 4, in which the aliphatic isocyanate compound (D) was added at the same time as the polyisocyanate compound (C) in the step for generating a urethane prepolymer, also demonstrated inferior adhesiveness.

Furthermore, Comparative Example 5, in which the aliphatic isocyanate compound (D) was not subsequently added, demonstrated even worse adhesiveness than Comparative Examples 1 to 4.

What is claimed is:

1. A method for producing a one-component moisture-curing polyurethane composition, the method comprising:
   a mixing step in which a liquid component (A) containing a polyol compound having two or more hydroxy groups in each molecule is mixed with a powder component (B) containing a filler so as to obtain a paste-like mixture of the liquid component (A) and the powder component (B);
   a dehydration step in which, following the mixing step, at least a portion of the residual moisture in the paste-like mixture is removed;
   a prepolymer generation step in which a polyisocyanate compound (C) having two or more isocyanate groups in each molecule is mixed with the paste-like mixture following the dehydration step so as to obtain a mixture containing a urethane prepolymer generated by a reaction between the polyisocyanate compound (C) and the polyol compound in the paste-like mixture; and
   a composition generation step in which the mixture is mixed with an aliphatic isocyanate compound (D) having at least two isocyanate groups in each molecule so as to obtain a one-component moisture-curing polyurethane composition.

2. The method for producing a one-component moisture-curing polyurethane composition according to claim 1, wherein the dehydration step is a step in which the moisture content of the paste-like mixture is controlled to at most 0.050 mass %.

3. The method for producing a one-component moisture-curing polyurethane composition according to claim 1, wherein in the composition generation step, a curing catalyst for inducing the moisture curing of the one-component moisture-curing polyurethane composition is further added.

4. The method for producing a one-component moisture-curing polyurethane composition according to claim 1, wherein in the prepolymer generation step, the polyisocyanate compound (C) and the paste-like mixture obtained in the mixing step are added and mixed sequentially.

5. The method for producing a one-component moisture-curing polyurethane composition according to claim 1, wherein in the prepolymer generation step, after the polyisocyanate compound (C) is mixed with the paste-like mixture obtained in the mixing step, a metal catalyst for accelerating a reaction for generating the urethane prepolymer is mixed.

6. The method for producing a one-component moisture-curing polyurethane composition according to claim 1, wherein the aliphatic isocyanate compound (D) is at least one type selected from the group consisting of a reaction product of hexamethylene diisocyanate and trimethylolpropane, a biuret of hexamethylene diisocyanate, and an isocyanurate of hexamethylene diisocyanate.

7. The method for producing a one-component moisture-curing polyurethane composition according to claim 3, wherein in the prepolymer generation step, the polyisocyanate compound (C) and the paste-like mixture obtained in the mixing step are added and mixed sequentially.

8. The method for producing a one-component moisture-curing polyurethane composition according to claim 4, wherein in the prepolymer generation step, after the polyisocyanate compound (C) is mixed with the paste-like mixture obtained in the mixing step, a metal catalyst for accelerating a reaction for generating the urethane prepolymer is mixed.

9. The method for producing a one-component moisture-curing polyurethane composition according to claim 7, wherein in the prepolymer generation step, after the polyisocyanate compound (C) is mixed with the paste-like mixture obtained in the mixing step, a metal catalyst for accelerating a reaction for generating the urethane prepolymer is mixed.

10. The method for producing a one-component moisture-curing polyurethane composition according to claim 3, wherein the aliphatic isocyanate compound (D) is at least one type selected from the group consisting of a reaction product of hexamethylene diisocyanate and trimethylolpropane, a biuret of hexamethylene diisocyanate, and an isocyanurate of hexamethylene diisocyanate.

11. The method for producing a one-component moisture-curing polyurethane composition according to claim 4, wherein the aliphatic isocyanate compound (D) is at least one type selected from the group consisting of a reaction product of hexamethylene diisocyanate and trimethylolpropane, a biuret of hexamethylene diisocyanate, and an isocyanurate of hexamethylene diisocyanate.

12. The method for producing a one-component moisture-curing polyurethane composition according to claim 5, wherein the aliphatic isocyanate compound (D) is at least one type selected from the group consisting of a reaction product of hexamethylene diisocyanate and trimethylolpropane, a biuret of hexamethylene diisocyanate, and an isocyanurate of hexamethylene diisocyanate.

13. The method for producing a one-component moisture-curing polyurethane composition according to claim 7, wherein the aliphatic isocyanate compound (D) is at least one type selected from the group consisting of a reaction product of hexamethylene diisocyanate and trimethylolpropane, a biuret of hexamethylene diisocyanate, and an isocyanurate of hexamethylene diisocyanate.

14. The method for producing a one-component moisture-curing polyurethane composition according to claim 8, wherein the aliphatic isocyanate compound (D) is at least one type selected from the group consisting of a reaction product of hexamethylene diisocyanate and trimethylolpropane, a biuret of hexamethylene diisocyanate, and an isocyanurate of hexamethylene diisocyanate.

15. The method for producing a one-component moisture-curing polyurethane composition according to claim 9, wherein the aliphatic isocyanate compound (D) is at least one type selected from the group consisting of a reaction product of hexamethylene diisocyanate and trimethylolpropane, a biuret of hexamethylene diisocyanate, and an isocyanurate of hexamethylene diisocyanate.

* * * * *